Aug. 12, 1958  H. E. LARISON  2,846,818

ELECTRIC SYNCHRONIZER FOR GLASS MACHINE FEEDER

Filed April 9, 1956  2 Sheets-Sheet 1

INVENTOR:
Harold E. Larison,
BY
Bair, Freeman & Molinare
ATTORNEYS.

Aug. 12, 1958     H. E. LARISON     2,846,818
ELECTRIC SYNCHRONIZER FOR GLASS MACHINE FEEDER
Filed April 9, 1956     2 Sheets-Sheet 2
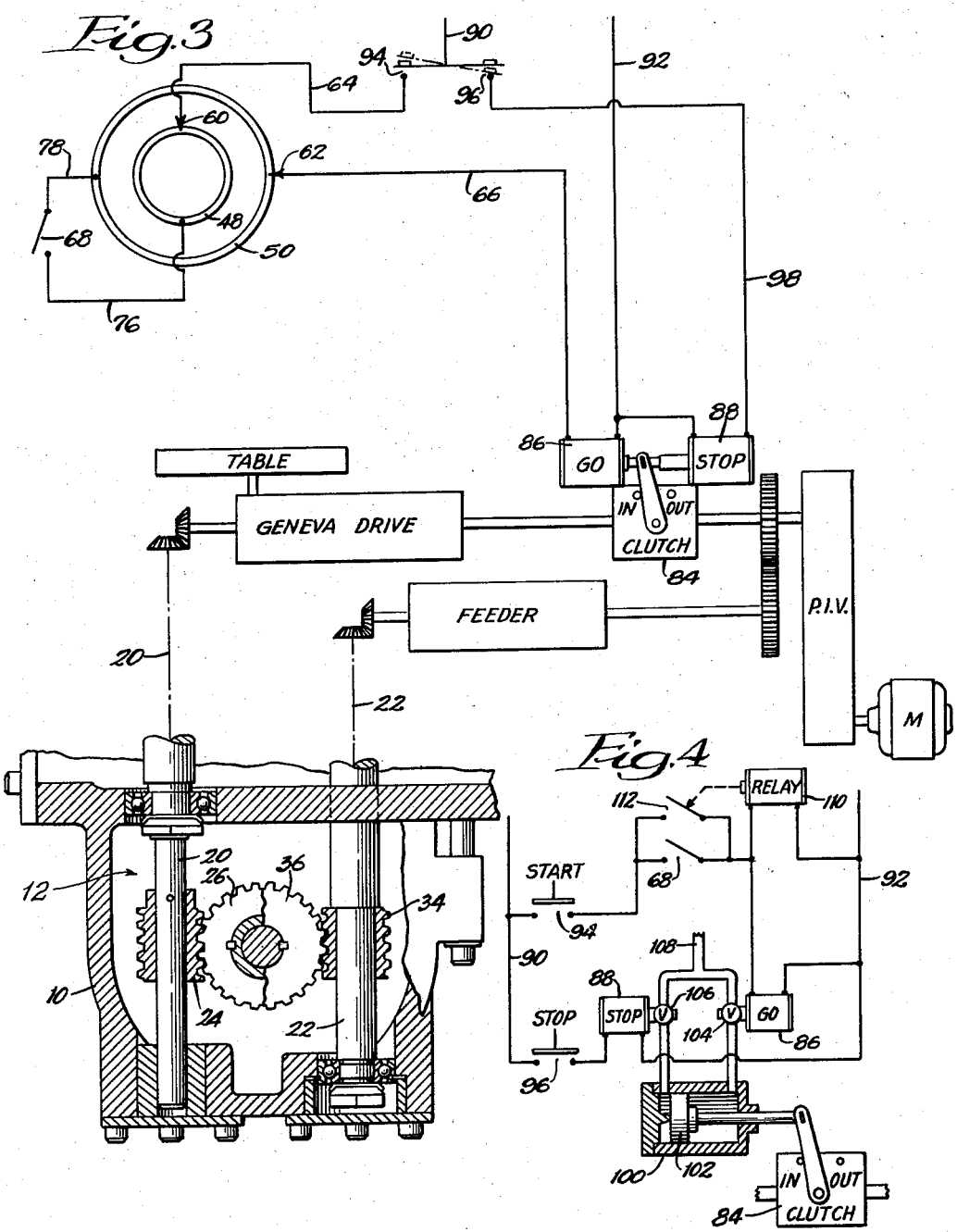
INVENTOR:
Harold E. Larison,
BY
Bair, Freeman & Molinare
ATTORNEYS.

United States Patent Office 2,846,818
Patented Aug. 12, 1958

2,846,818
ELECTRIC SYNCHRONIZER FOR GLASS MACHINE FEEDER

Harold E. Larison, Anderson, Ind., assignor to Lynch Corporation, Anderson, Ind., a corporation of Indiana Application April 9, 1956, Serial No. 577,101

12 Claims. (Cl. 49—5)

This invention relates to automatic synchronizing means which is electrically operated and which is operable to synchronize the operation of a glassware manufacturing machine with a glass feeder therefor.

One object of the invention is to provide a means to automatically synchronize the machine drive with the feeder when commencing the operation of the machine or when putting it back into service after it has been stopped for repairs or other purposes. My synchronizer is particularly adapted for use in connection with a glassware machine timer of the kind shown in my co-pending application, Serial No. 570,889 filed March 12, 1956, to replace a pair of timing dials thereof, one of which is driven by the feeder and the other by the machine, and which dials have pointers that must be matched with each other by the operator and a clutch then manually thrown in; whereas the present arrangement permits the simple operation of depressing a starting button whereupon the synchronizer herein disclosed automatically throws the clutch in at the proper time for synchronization.

Another object is to provide a brush and collector ring arrangement between an electric circuit and one timing shaft, and a timer switch and cam connection between the two timer shafts so that the timer switch is in such electric circuit.

Still another object is to provide one timer shaft continuously driven as long as the feeder is in operation and a second timer shaft which is driven only when the machine is in operation, a clutch connection being provided from the source of power to the machine that can be thrown out when a "stop" button is depressed and thrown in again automatically at the point of synchronism when a "start" button is depressed.

A further object is to provide "stop" and "go" solenoids and stop and start buttons for controlling them, with the stop button directly controlling the "stop" solenoid but the start button controlling the "go" solenoid only through the synchronizing timer switch so that the desired synchronism is had automatically.

Still a further object is to provide a holding relay to insure that the "go" solenoid will be energized sufficiently long enough to insure complete throw in of the clutch, particularly when the solenoids are used to operate air valves that control a pneumatic operating means for the clutch.

An additional object is to provide a timer switch and cam combination in which the timer switch is closed only momentarily to avoid malfunctioning, and a holding relay is provided having holding contacts shunting the timer switch to insure a long enough energization of the "go" solenoid to completely throw the clutch from the "out" to the "in" position.

With these and other objects in view, my invention consists in the construction, arrangement and combination of the various parts of my electric synchronizer whereby the objects above contemplated are attained, as hereinafter more fully set forth, pointed out in my claims and illustrated in detail on the accompanying drawings, wherein:

Fig. 3 is a part sectional and part diagrammatic view showing both machine elements and an electric circuit diagrammatically; and Fig. 4 is a somewhat similar diagrammatic view showing a modified form of the invention.

Figure 1:
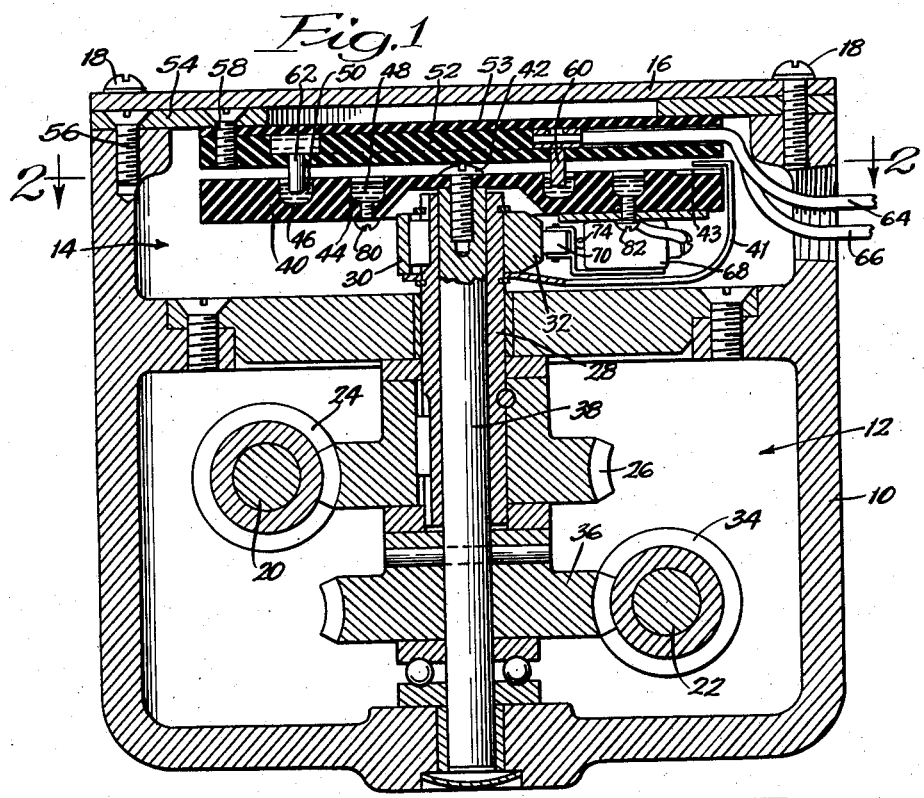
Fig. 1 is a vertical sectional view through an electric synchronizer embodying my invention.

On the accompanying drawings, I have used the reference numeral 10 to indicate a housing in which there is a gear chamber 12 and a timer chamber 14. A cover 16 is provided for the housing 10 and is secured in position by screws 18.

Projecting into the gear chamber 12 is a machine shaft 20 and a feeder shaft 22. A worm 24 on the machine shaft 20 drives a worm gear 26 secured to a vertical sleeve 28. Adjacent the upper end of the sleeve 28 I provide a cam 30 having a cam lobe 32.

Within the gear chamber 12, a worm gear 34 is provided on the feeder shaft 22 meshing with a worm 36. The worm gear 36 is secured to a shaft 38 extending upwardly through the sleeve 28 and on its upper end a timer disc 40 is mounted by a screw 42. The disc can be changed in its angular relation to the shaft 38 for adjustment to the desired synchronization and the screw 42 may then be tightened to retain the adjustment.

The timer disc 40 is provided with a pair of concentric mercury receiving grooves 44 and 46 containing mercury indicated at 48 and 50. Above the disc 40 is a stationary disc 52 supported by a centrally apertured plate 54 held in position on the upper end of the housing 10 by screws 56 and underneath the cover plate 16. The stationary disc 52 is suspended from the plate 54 by screws 58. The discs 40 and 52 are preferably of insulating material and a cover disc 53 also of insulating material is provided to prevent grounds or short circuits in the wiring.

A pair of pins 60 and 62 extend downwardly from the stationary disc 52 and dip into the mercury 48 and 50 respectively so that the mercury and these pins form a brush and collector ring assembly for an electric circuit. Wires 64 and 66 extend to the pins 60 and 62 respectively as shown in Fig. 1.

A timer switch 68 is mounted on the bottom of the disc 40 and is carried therewith as the disc rotates. The switch is connected in the circuit by means of wires 76 and 78 and screws 80 and 82 that extend up into the mercury in the grooves 44 and 46 to complete an electric circuit from the wire 64 to the wire 66 when the switch 68 is closed. The switch has an actuating blade 72 to engage a switch actuating pin 74 under the action of a roller 70 traveling the cam 30 and depressed by the lobe 32 thereof when it registers with the roller. The switch 68 is normally open and is closed when the cam is in the position shown in Fig. 2.

Referring to Fig. 3, the glass feeder for a glassware forming machine is indicated "Feeder" and is driven from a motor M by a positively infinitely variable gear P. I. V. The glassware forming machine includes a table as well as other instrumentalities driven by a Geneva drive and both the table and the Geneva drive are so labelled. Interposed between the P. I. V. gear and the Geneva drive is the clutch indicated at 84 and to operate it, a "go" solenoid 86 is shown and a "stop" solenoid 88. Current supply wires 90 and 92 are illustrated and the wire 90 goes to a "start" button 94 and a "stop" button 96. A wire 98 connects the "stop" button 96 to the "stop" solenoid 88.

The circuit shown in Fig. 3 is comparatively simple and illustrates one possibility of my electric synchronizer where the clutch can be satisfactorily operated by momentary energization of solenoids.

In some machines however, and particularly the larger ones, it is desirable to operate the clutch pneumatically as shown in Fig. 4. A cylinder 100 is shown wherein there is a piston 102 connected with the clutch 84 to operate it. To control the movements of the piston 102, there is a "go" valve 104 and a "stop" valve 106 which receive main air from a compressed air supply line 108 for actuating the piston 102. The valves 104 and 106 may be of the three-way type for exhausting air when in their "off" positions. The valves are solenoids valves operated by the "go" and "stop" solenoids 86 and 88 and the circuit otherwise is substantially the same as shown in Fig. 3 with the addition of a relay 110 and holding contacts 112. The contacts 112 are normally open, and closed by the relay when it is energized. These holding contacts shunt the timer switch 68.

Figure 2:
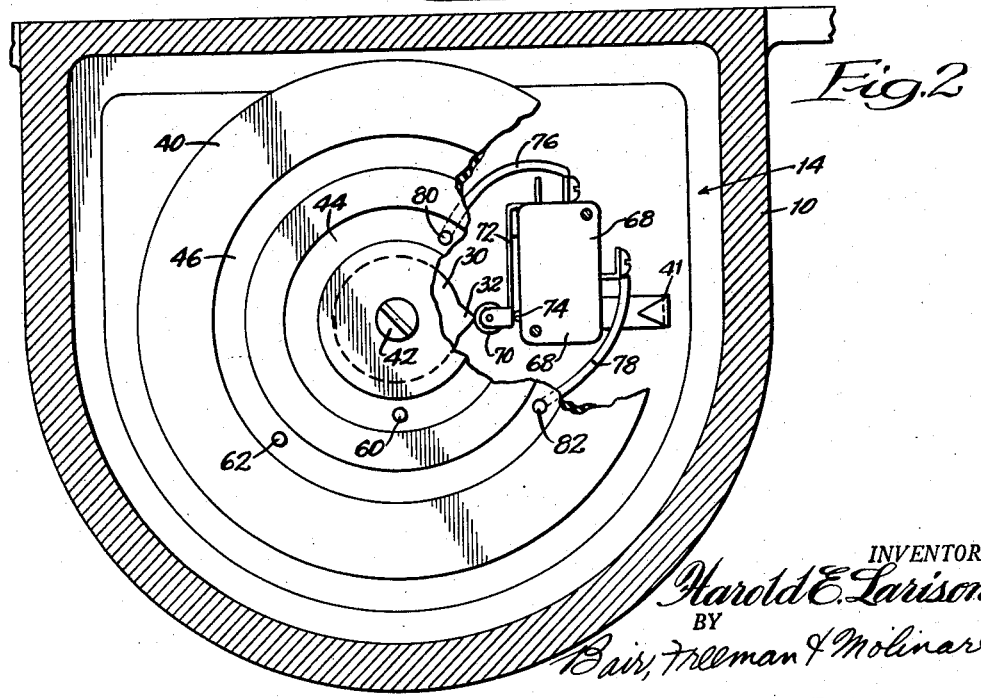
Fig. 2 is a horizontal sectional view thereof on the line 2—2 of Fig. 1 to show a collector ring arrangement, and the timer switch and cam combination associated therewith.

*Practical operation of Figs. 1, 2 and 3*

In the operation of a glassware forming machine, it is necessary that the feeder continue in operation even though the machine is shut down for repairs or adjustment, etc. in order to keep the glass-melting furnace operating properly. When it is desirable to place the machine again into operation, it must be synchronized with the operation of the feeder. Heretofore, this has been done manually by the operator watching the feeder dial pointer as it rotates as shown in my co-pending application above referred to and throwing the clutch in at the proper time for the machine pointer to coincide with the feeder pointer. My present arrangement insures such synchronizing automatically, however, as will now be described.

When it is desirable to stop the machine, the "stop" button 96 is depressed which energizes the "stop" solenoid 88 for throwing the clutch out. When it is desirable to throw the clutch in again, the "start" button 94 is depressed but the "go" solenoid 86 will not be energized until the timer switch 68 closes under the action of the cam 30 which, of course, occurs at only one point in the rotation of the feeder disc 40 and the timer switch carried thereby relative to the cam 32 which at that time is stationary because of the machine shaft 20 being stationary. The two may be properly set for synchronism relative to each other by means of a pointer 41 on the cam shaft and a pointer 43 on the disc 40 as shown in the upper right portion of Fig. 1 (using the screw 42 for this purpose).

*Practical operation of Fig. 4*

When the "stop" button 96 is depressed, the "stop" solenoid 88 is energized for opening the valve 106 to admit air from the supply pipe 108 to the left-hand end of the cylinder 100 for throwing the piston 102 toward the right and thus throw the clutch "out." When it is desirable to start up the machine again, the "start" button 94 is depressed which will energize the "go" solenoid 86 when the timer switch 68 closes. Thereupon air is admitted from 108 through the valve 104 to the right-hand end of the cylinder 102 for throwing the clutch from the "out" to the "in" position.

The cam lobe 32 is preferably one which gives a very short pulse as, if a cam is provided which is sufficiently long enough to keep the timer switch 68 closed long enough for the piston 102 to throw from the "out" to the "in" position, there might be times when the "start" button would be depressed while the roller is part way along the cam and the remaining portion of the cam lobe would result in only an incomplete throw of the clutch. Therefore, I provide the holding contacts 112 closed by the relay 110 so that the momentary closing of the timer switch 68 is shunted by the closed contacts 112 and these would be held on for a sufficiently long period because the operator, when he hears the clutch start, could not remove his finger from the "start" button 94 soon enough to result in an incomplete clutch movement. Instead, he would hold the "start" button closed longer than the timer switch 68 is closed and thereby the holding contacts would be held closed until the "start" button is released whereupon the circuit to the relay coil is broken and the holding contacts will then reopen. Thus the relay and its holding contacts insure a sufficiently long pulse in the "go" solenoid 86 to insure complete "clutch-in" operation even though the timer switch 68 is closed only momentarily.

Some changes may be made in the construction and arrangement of the parts of my electric synchronizer without departing from the real spirit and purpose of my invention. It is, therefore, my intention to cover by my claims any modified forms of structure or use of mechanical equivalents which may reasonably be included within their scope.

I claim as my invention:

1. In an electric synchronizer for glass machine feeders, a pair of rovolving elements, one driven in synchronism with the feeder and the other driven in synchronism with the machine wherein the machine is provided with a stop and go clutch and the revolving element of the machine is thereby stationary when the clutch is in its stop position, and control means for automatically synchronizing the machine with the feeder by controlling said clutch, said control means comprising a go solenoid for effecting throw in of the clutch and a stop solenoid for effecting throw out of the clutch, a push button for energizing said go solenoid, a timer switch in series therewith whereby both the push button and the timer switch must be closed to energize said go solenoid, and means for closing said timer switch at only one position of said revolving element of said feeder relative to said revolving element of said machine when stationary.

2. In an electric synchronizer for glass machine feeders, a pair of revolving elements, one driven in synchronism with the feeder and the other driven in synchronism with the machine wherein the machine is provided with a stop and go clutch and the revolving element of the machine is thereby stationary when the clutch is in its stop position, and control means for automatically synchronizing the machine with the feeder by controlling said clutch, said control means comprising a go solenoid for effecting throw in of the clutch and a stop solenoid for effecting throw out of the clutch, a push button for energizing said go solenoid, a timer switch in series therewith whereby both the push button and the timer switch must be closed to energize said go solenoid, means for mounting said timer switch on one of said pair of revolving elements, and a cam on the other thereof for closing said timer switch in only one position of rotation of said revolving element of said feeder relative to said revolving element of said machine when in stopped position.

3. In an electric synchronizer of the class described for a pair of revolving elements, one driven in synchronism with one machine element and the other driven in synchronism with another machine element, and control means for synchronizing said machine elements by controlling the clutch of one of them comprising a go solenoid for effecting throw in of the clutch and a stop solenoid for effecting throw out of the clutch, a push button for energizing said go solenoid, a timer switch in series therewith whereby both the push button and the timer switch must be closed to energize said go solenoid, means for mounting said timer switch on one of said pair of revolving elements, and a cam on the other thereof for closing said timer switch in only one position of relative rotation between said revolving elements.

4. In an electric synchronizer for a glass machine feeder, a pair of elements, one driven in synchronism with the feeder, the other driven in synchronism with the glass machine and each one revolution of said feeder and said glass machine respectively, and control means for synchronizing the glass machine with the feeder in less time than one cycle of operation of said feeder by controlling the clutch of the machine, said control means comprising a go solenoid for effecting throw in of the clutch and a stop solenoid for effecting throw out of the clutch, a circuit for energizing said go solenoid, a timer switch in said circuit whereby the timer switch must be closed to energize the go solenoid, and means for closing said timer switch at only one position of said element of said feeder relative to said element of said glass machine when said last element is in stopped position.

5. In an electric synchronizer for a glass machine feeder, a pair of revolving elements, one driven in synchronism with the feeder, the other driven in synchronism with the glass machine and each one revolution of said feeder and said glass machine respectively, and control means for synchronizing the glass machine with the feeder in less time than one cycle of operation of said feeder by controlling the clutch of the machine, said control means comprising pneumatic means for throwing said clutch in or out, a pair of solenoid valves for controlling air to said pneumatic means to move it selectively to the clutch-in or the clutch-out position, a pair of push buttons, one for energizing each of said solenoids, and a timer switch in series with the push button that energizes the solenoid to effect clutch-in operation, said timer switch being closed at only one position of said revolving element of said feeder relative to said element of said glass machine when said last element is stationary as a result of said clutch having been thrown out.

6. In an electric synchronizer for a glass machine feeder, a pair of revolving elements, one driven in synchronism with the feeder and the other driven in synchronism with the glass machine, and control means for synchronizing the glass machine with the feeder by controlling the clutch of the machine, said control means comprising pneumatic means for throwing said clutch in or out, a pair of solenoid valves for controlling air to said pneumatic means to move it selectively to the clutch-in or the clutch-out position, a pair of push buttons, one for energizing each of said solenoids, a timer switch in series with the push button which energizes the solenoid for clutch-in operation, means for mounting said timer switch on one of said pair of revolving elements, and a cam mounted on the other thereof for closing said timer switch in only one position of relative rotation between said revolving elements.

7. In a synchronizer for glass machine feeders, a pair of revolving elements, one driven in synchronism with the feeder and the other driven in synchronism with the machine, and control means for synchronizing the machine with the feeder by controlling the clutch of the machine comprising a go solenoid for effecting throw in of the clutch and a stop solenoid for effecting throw out thereof, a push button for energizing said go solenoid, a timer switch in series therewith whereby both the push button and the timer switch must be closed to energize the go solenoid, means for mounting said timer switch on one of said pair of revolving elements, a cam on the other thereof for closing said timer switch in only one position of relative rotation between said revolving elements, and a normally open relay having its coil shunting said go solenoid and its contacts shunting said timer switch and constituting holding contacts therefor.

8. In an electric synchronizer of the class described, a pair of revolving elements, one driven in synchronism with a glass feeder and the other driven in synchronism with a glass machine wherein the machine is provided with a stop and go clutch and the revolving element of the machine is thereby stationary when the clutch is in its stop position, and control means for synchronizing the machine with the feeder by controlling said clutch, said control means comprising a go solenoid for effecting throw in of the clutch and a stop solenoid for effecting throw out of the clutch, a push button for energizing said go solenoid, a timer switch in series therewith whereby both the push button and the timer switch must be closed to energize the go solenoid, means for closing said timer switch only momentarily and at only one position of said element of said feeder relative to said element of said machine when halted, and a normally open relay having its coil shunting said go solenoid to be energized simultaneously therewith and its contacts shunting said timer switch to retain said go solenoid energized after said timer switch opens and until said push button for said go solenoid is released.

9. In a synchronizer for glass machine feeders, a pair of revolving elements, one driven in synchronism with the feeder, the other driven in synchronism with the machine and each one revolution of said feeder and said glass machine respectively, and control means for synchronizing the machine with the feeder in less time than one cycle of operation of said feeder by controlling the clutch of the machine comprising pneumatic means for throwing said clutch in or out, a pair of solenoid valves for controlling air to said pneumatic means to move it selectively to the clutch-in or the clutch-out position, a pair of push buttons, one for energizing each of said solenoids, a timer switch in series with the push button that energizes the solenoid that effects clutch-in operation, said timer switch being closed at only one position of said element of said feeder relative to said element of said machine when in stopped position, and a normally open relay having its coil shunting said go solenoid to be energized simultaneously therewith and its contacts shunting said timer switch to retain said go solenoid energized after said timer switch opens and until said push button for said go solenoid is released.

10. In an electric synchronizer for glass machine feeders, a pair of revolving elements, one driven in synchronism with the feeder and the other driven in synchronism with the machine, and control means for synchronizing the machine with the feeder by controlling the clutch of the machine, said control means comprising pneumatic means for throwing said clutch, a pair of solenoid valves for controlling air to said pneumatic means to move it selectively to the clutch in or the clutch out position, a pair of push buttons, one for energizing each of said solenoids, a timer switch in series with the push button that energizes the solenoid to effect clutch-in operation and mounted on one of said revolving elements, a cam mounted on the other thereof for closing said timer switch in only one position of relative rotation between said revolving elements, and a normally open relay having its coil shunting said go solenoid and its contacts shunting said timer switch to constitute holding contacts for said timer switch.

11. In an electric synchronizer for glass machine feeders, a pair of revolving elements, one driven in synchronism with the feeder and the other driven in synchronism with the machine, and control means for automatically synchronizing the machine with the feeder by controlling the clutch of the machine, said control means comprising a go solenoid for effecting throw in of the clutch and a stop solenoid for effecting throw out of the clutch, a push button for energizing said go solenoid, a timer switch in series therewith whereby both the push button and the timer switch must be closed to energize said go solenoid, means for mounting said timer switch on one of said pair of revolving elements, a cam on the other thereof for closing said timer switch in only one position of relative rotation between said revolving elements, and means for conducting current to said timer switch comprising a pair of concentric grooves in said one of said revolving elements and connected with the poles of said timer switch, mercury in each of said grooves, and stationary current carrying elements contacting the mercury in said grooves.

12. In an electric synchronizer of the class described for a pair of revolving elements, one driven in synchronism with one machine element and the other driven in synchronism with another machine element, and control means for synchronizing said machine elements by controlling the clutch of one of them comprising a go solenoid for effecting throw in of the clutch and a stop solenoid for effecting throw out of the clutch, a push button for energizing said go solenoid, a timer switch in series therewith whereby both the push button and the timer switch must be closed to energize said go solenoid, means for mounting said timer switch on one of said pair of revolving elements, a cam on the other thereof for closing said timer switch in only one position of relative rotation between said revolving elements, and means for conducting current to said timer switch comprising mercury grooves in said first revolving element, stationary elements in the circuit and entering said grooves, and mercury in said grooves contacting said elements.

References Cited in the file of this patent
UNITED STATES PATENTS 2,555,448     Koob  ---------------- June 5, 1951